United States Patent [19]

Gutsch et al.

[11] Patent Number: 5,748,425
[45] Date of Patent: May 5, 1998

[54] ELECTROSTATIC DISCHARGE CIRCUIT LAYOUT

[75] Inventors: Henrik Gutsch; Horst Häfner, both of Heilbronn; Hermann Hammel, Rot am See; Friedemann Schmidt, Stuttgart; Jürgen Schnabel, Leingarten, all of Germany

[73] Assignee: Temic Telefunken microelectronic GmbH, Heilbronn, Germany

[21] Appl. No.: 732,994

[22] Filed: Oct. 16, 1996

[30] Foreign Application Priority Data

Oct. 20, 1995 [DE] Germany ............... 195 39 079.2

[51] Int. Cl.$^6$ ............................................. H02H 9/00
[52] U.S. Cl. ........................... 361/56; 361/86; 361/111
[58] Field of Search ........................... 361/56, 58, 91, 361/111, 86

[56] References Cited

U.S. PATENT DOCUMENTS

| | | | |
|---|---|---|---|
| 5,189,588 | 2/1993 | Yano et al. | 361/56 |
| 5,276,582 | 1/1994 | Merrill et al. | 361/111 |
| 5,477,414 | 12/1995 | Li et al. | 361/56 |
| 5,610,790 | 3/1997 | Staab et al. | 361/56 |

FOREIGN PATENT DOCUMENTS

| | | |
|---|---|---|
| 0606667 | 7/1994 | European Pat. Off. . |
| 3635729 | 4/1987 | Germany . |
| 4135522 | 4/1993 | Germany . |

*Primary Examiner*—Jeffrey A. Gaffin
*Assistant Examiner*—Michael J. Sherry
*Attorney, Agent, or Firm*—Spencer & Frank

[57] ABSTRACT

In order to protect against any damage caused by electrostatic discharges, an integrated circuit layout is provided with at least one circuit connection which is connected via one of two diodes, respectively, to a first supply line and a second supply line. The diodes are reverse biased, i.e., one of them becomes conductive if a potential exists at the circuit connection that is either higher or lower than the supply potentials applying to the supply lines. The circuit layout is provided with an overvoltage suppression device connecting the two supply lines. The overvoltage suppression device is switched into a low impedance state by a steep rate increase or rise in a supply voltage applied between the supply lines such that a discharge current counteracting the increase in the supply voltage will flow via the overvoltage suppression device from the one supply line to the other supply line, and the discharge energy is converted into heat in the overvoltage suppression device.

7 Claims, 1 Drawing Sheet

5,748,425

ELECTROSTATIC DISCHARGE CIRCUIT LAYOUT

BACKGROUND OF THE INVENTION

An integrated circuit layout can be destroyed by a discharge current which, during an electrostatic discharge, flows through a circuit connection of the circuit layout. In order to protect the circuit layout against such damage, at least some of its circuit connections are normally connected via a reverse biased diode with a first and with a second supply line between which a supply voltage is applied. Here, the first supply line has a first supply potential, and the second supply line a second supply potential. In the event of an electrostatic discharge, one of these circuit connections will be fed a potential that is either larger or smaller than the two supply potentials mentioned above. This will cause one of the diodes connected to this circuit connection to become pre-biased in forward direction so that a discharge current will flow from the circuit connection, via this diode, to the relevant supply line. In the diode, some part of the energy produced by this electrostatic discharge, i.e., some part of the discharge energy, will be converted into heat.

However, such diodes provide only limited protection against an electrostatic discharge, as the discharge current can still flow via the supply lines to the circuit where it is able to destroy sensitive circuit components.

SUMMARY OF THE INVENTION

The invention is therefore based on the object of providing a circuit layout comprising two supply lines between which a supply voltage is applied, as well as at least one circuit connection, which is connected to the first and second supply lines, respectively, via a reverse biased diode in order to protect the circuit layout against any damage caused by electrostatic discharges, which circuit layout is to a very large extent insensitive to electrostatic discharges, operates reliably and can be integrated at favorable cost.

The above object is achieved according to the present invention by a circuit layout comprising two supply lines between which a supply voltage is applied, as well as at least one circuit connection which is connected to the first and second supply lines, respectively, via a reverse biased diode in order to protect the circuit layout against any damage caused by electrostatic discharges, at least one overvoltage suppression device connecting the two supply lines with the overvoltage suppression device being switched into a low impedance state by a steep increase or rise in a supply voltage applying between the two supply lines, thus counteracting any increase in the supply voltage. Advantageous further applications and designs are disclosed.

The circuit layout according to this invention features at least one overvoltage suppression device which is connected to the first and second supply lines. The overvoltage suppression device can be switched into a low-impedance state via the supply voltage which is applied between the supply lines. The device will be switched into the low-impedance state if the supply voltage rate increases or rises with great steepness to a new value due to the discharge current flowing through one of the diodes during an electrostatic discharge. The device also is preferably switched into the low-impedance state, if the supply voltage exceeds a predefined threshold voltage. To this end, the overvoltage suppression unit is provided with a threshold value detector monitoring the supply voltage. The discharge current thus flows through the overvoltage suppression device from one of the two supply lines to the other supply line, so that the discharge energy in the overvoltage suppression device is converted into heat. In this way, the discharge current counteracts any further increase in the supply voltage.

As, during a steep increase or rise of the supply voltage, the overvoltage suppression device is switched into the low-impedance state even during the increase, that is, before the threshold voltage is exceeded, the supply voltage is limited at an early stage to values which are permissible for the circuit layout. During any electrostatic discharge this timely measure prevents voltage peaks at the supply lines from occurring which may be damaging to the circuit layout.

Preferably, the overvoltage suppression device is provided with a shunt transistor which in normal mode is in a blocking state, i.e., a high impedance state, and by means of which the supply lines are connected to each other. The overvoltage suppression device also features a first differential i.e., differentiating element connected to the supply lines which is provided for driving the shunt transistor and which will switch the shunt transistor into a conductive, i.e., low-impedance state in the event of any increase in the supply voltage. This switching sequence can be accelerated by a second differential i.e., differentiating element provided for in the overvoltage suppression device.

Here, a differential element is preferably provided with a series circuit connected to the supply lines and comprising a capacitor, resistor, as well as an amplifier transistor which is driven by a voltage applied to the resistor and by means of which the shunt transistor is switched into the conductive or blocking state.

Due to the circuit being less complex as well as due to the low space requirements occasioned by the low number of components—for several circuit connections of the circuit layout only one overvoltage suppression device is needed—, the overvoltage suppression device can be integrated at favorable cost. This device provides particularly high protection against electrostatic discharges as even during the increase in supply voltage caused by the electrostatic discharge so much discharge energy is converted into heat that the supply voltage does not exceed the threshold voltage, i.e. the maximum permissible value.

Using the figure, the invention is described below in more detail.

DESCRIPTION OF THE PREFERRED EMBODIMENTS

Figure 1:
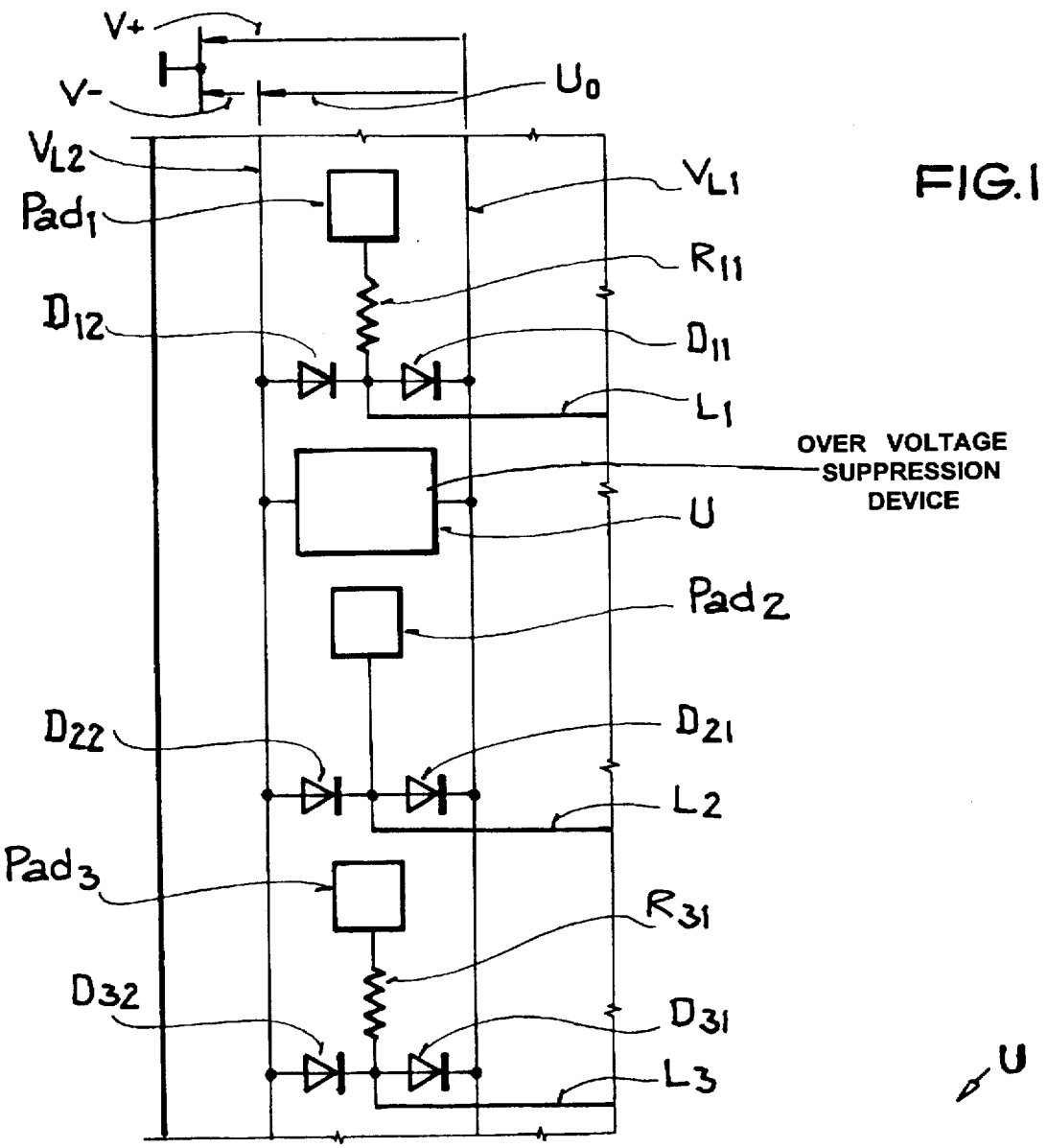
FIG. 1 is a schematic diagram showing a section of an integrated circuit complete with an overvoltage suppression unit.

According to FIG. 1 the circuit connections $Pad_1 \ldots Pad_3$ designed as bond pads are connected either directly, or via drop resistors $R_{11}, R_{31}$, with one of the signal lines $L_1$ or $L_2$ or $L_3$, respectively, by means of which lines signals from the circuit connections $Pad_1 \ldots Pad_3$ are fed to the circuit layout or from the circuit layout to the circuit connections $Pad_1 \ldots Pad_3$. The signal lines $L_1 \ldots L_3$ are connected—as closely as possible to the respective circuit connections $Pad_1 \ldots Pad_3$ and via one of the diodes $D_{11} \ldots D_{32}$, respectively, —with the first supply line $V_{L1}$ and the second supply line $V_{L2}$. The diodes $D_{11} \ldots D_{32}$ will be switched such that they block during normal operation, with normal operation designating the case where the potentials at the circuit connections $Pad_1 \ldots Pad_3$ are between the first supply potential $V_+$ applying to the first supply line $V_{L1}$ and the second supply potential $V_-$ applying to the second supply line $V_{L2}$. As—in the present example—the first supply potential $V_+$ is greater than the second supply potential $V_-$ by the value of the supply voltage $U_0$, where the second supply potential $V_-$ is a mass potential (for instance), the diodes $D_{11}$, $D_{21}$, $D_{31}$ are each connected with their cathodes to the first supply line $V_{L1}$, and the diodes $D_{12}$, $D_{22}$, $D_{32}$ are each connected with their anodes to the second supply line $V_{L2}$. The anode of diode $D_{11}$ or $D_{21}$ or $D_{31}$ is connected with the cathode of diodes $D_{12}$ or $D_{22}$ or $D_{32}$ as well as with signal lines $L_1$ or $L_2$ or $L_3$. The first supply line $V_{L1}$ is connected with the second supply line $VL_2$ via the overvoltage suppression device U which, in normal operation, has a high impedance, whilst in the event of an electrostatic discharge it has a low impedance.

Figure 2:
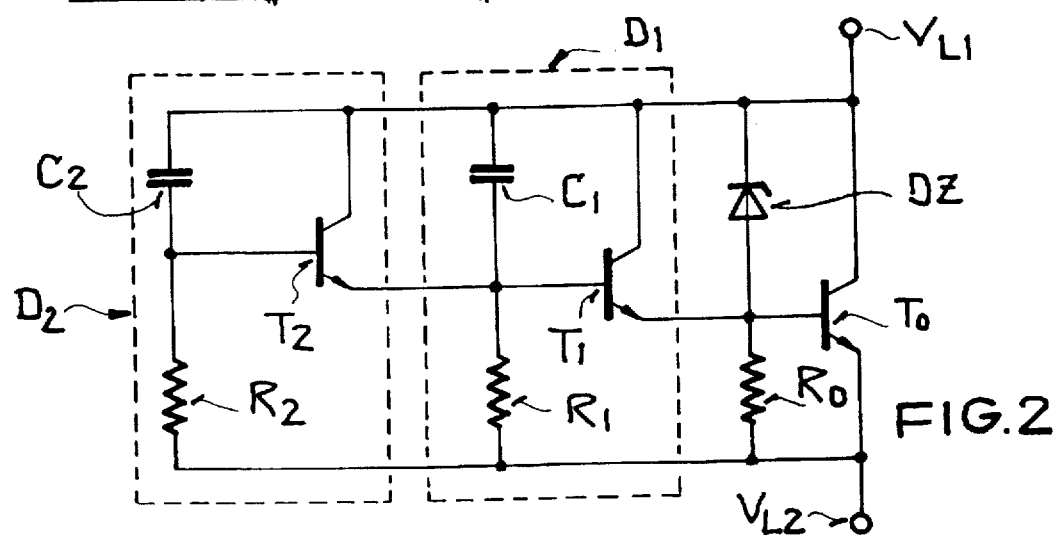
FIG. 2 is a circuit diagram as an example for an embodiment of an overvoltage suppression device from FIG. 1.

According to FIG. 2, the overvoltage suppression device U comprises the shunt transistor $T_0$ which is designed as a large area npn transistor, the threshold value detector made up of Z diode (Zener diode) DZ, the leakage resistor $R_0$ for leakage currents, the first differential (differentiating) element $D_1$ with a first amplifier transistor $T_1$, designed as an npn transistor, with a first capacitor $C_1$ and with a first resistor $R_1$, as well as the second differential (differentiating) element $D_2$ with a second amplifier transistor $T_2$, also designed as an npn transistor, with a second capacitor $C_2$ and with a second resistor $R_2$. The first supply line $V_{L1}$ is connected to the collector of the shunt transistor $T_0$, the cathode of Z-Diode DZ, the collector of the first amplifier transistor $T_1$, the collector of the second amplifier transistor $T_2$, as well as both capacitors $C_1$, $C_2$. The second supply line $VL_2$ is connected to the emitter of shunt transistor $T_0$, the leakage resistor $R_0$, as well as the first and second resistors $R_1$, $R_2$. The base of shunt transistor $T_0$ is connected to the anode of Z diode DZ, the emitter of the first amplifier transistor $T_1$, and, via the leakage resistor $R_0$, with the second supply line $V_{L2}$; the base of the first amplifier transistor $T_1$ is connected to the emitter of the second amplifier transistor $T_2$, and, via the first capacitor $C_1$, with the first supply line $V_{L1}$, as well as, via the first resistor $R_1$, with the second supply line $V_{L2}$; via the second capacitor $C_2$, the base of the second amplifier transistor $T_2$ is connected to the first supply line $V_{L1}$, and via the second resistor $R_2$, to the second supply line $V_{L2}$.

In the event of an electrostatic discharge, one of the circuit connections $Pad_1 \ldots Pad_3$ is fed with a potential which is greater than the first supply potential $V_+$ or lower than the second supply potential $V_-$. If the potential on one of the circuit connections $Pad_1 \ldots Pad_3$ is greater than the first supply potential $V_+$, the diode—out of the diodes $D_{11}$, $D_{21}$, $D_{31}$—which is connected to this circuit connection $Pad_1$ or $Pad_2$ or $Pad_3$ as well as to the first supply line $V_{L1}$ will become conductive. If, however, the potential on one of the circuit connections $Pad_1 \ldots Pad_3$ is lower than the second supply potential $V_-$, the diode—out of the diodes $D_{12}$, $D_{22}$, $D_{32}$—which is connected to this circuit connection $Pad_1$ or $Pad_2$ or $Pad_3$, as well as to the second supply line $V_{L2}$, will become conductive.

The discharge current which then flows through the conductive diode $D_{11}$ or $\ldots$ $D_{32}$ will cause an increase or rise of the supply voltage $U_0$ which applies between the supply lines $V_{L1}$, $V_{L2}$. If this increase occurs with such steepness i.e., slope or gradient, that the base potential of the first or second amplifier transistor $T_1$, $T_2$ increases by at least a base emitter flow voltage, this will switch the first amplifier transistor $T_1$—or both amplifier transistors $T_1$, $T_2$—into the conductive state. The shunt transistor $T_0$ will thus be fed a base current; this causes the shunt transistor $T_0$ to be switched into the conductive state also. The discharge current which then flows through shunt transistor $T_0$ will counteract any further increase in the supply voltage $U_0$.

Both amplifier transistors $T_1$, $T_2$ and the shunt transistor $T_0$ will then form a three-stage Darlington arrangement with high current amplification. The shunt transistor $T_0$ will thus be very quickly switched into the low impedance state and is capable of taking up a high discharge current in this state.

As soon as the supply voltage $U_0$ exceeds a predefined threshold voltage depending on the Z diode DZ, this Z diode DZ will become conductive. The shunt transistor $T_0$ will then be fed a base current via Z diode DZ and thus be switched into the conductive state. Due to the discharge current which will then flow through shunt transistor $T_0$, the supply voltage $U_0$ will be limited to a value lower than the threshold voltage.

Alternatively, the anode of Z diode DZ may also be connected to the base of the first or second amplifier transistor $T_1$, $T_2$. In this case, the shunt transistor $T_0$ will not be switched directly, via Z diode DZ, into the conductive state but via the first or second amplifier transistor $T_1$ or $T_2$. The anode of Z diode DZ may also be connected directly to the second supply line. However, it must then be capable of taking up the total discharge current flowing through the overvoltage suppression device U and thus be dimensioned with appropriate capacity.

With a steep and great increase or rise in the supply voltage $U_0$, the overvoltage suppression device U is thus switched into the low impedance state by two mechanisms. Here, the one mechanism—limitation by the steeply increasing or rising supply voltage $U_0$—and the other mechanism—limitation by the supply voltage $U_0$ exceeding the threshold voltage—complement each other.

What is claimed is:

1. A circuit layout comprising two supply lines ($VL_1$, $VL_2$), between which a supply voltage ($U_0$) is applied, as well as at least one circuit connection ($Pad_1 \ldots Pad_3$), which is connected to the first and second supply lines ($VL_1$, $VL_2$), respectively, via a reverse biased diode ($D_{11} \ldots D_{32}$) in order to protect the circuit layout against any damage caused by electrostatic discharges, wherein the circuit layout features at least one overvoltage suppression device (U) connecting the two supply lines ($VL_1$, $VL_2$), and wherein the overvoltage suppression device (U) is switched into a low impedance state in response to a steep rate increase in the supply voltage ($U_0$) applied between the two supply lines ($VL_1$, $VL_2$), thus counteracting any increase in the supply voltage ($U_0$).

2. Circuit layout according to claim 1 wherein the overvoltage suppression device (U) additionally is provided with a threshold value detector (DZ) by means of which the overvoltage suppression device (U) can be switched into the low impedance state whenever the supply voltage ($U_0$) exceeds a predefined threshold voltage.

3. Circuit layout according to claim 1 wherein the overvoltage suppression device (U) includes a shunt transistor ($T_0$) and a first differentiating element ($D_1$) for driving the shunt transistor ($T_0$), with the first supply line ($V_{L1}$) being connected to the second supply line ($V_{L2}$) via the shunt transistor ($T_0$) and the first differentiating element ($D_1$), and with the first differentiating element ($D_1$) switching the shunt transistor ($T_0$) into a conductive state in the event of a steep rate increase in the supply voltage ($U_0$).

4. Circuit layout according to claim 3 wherein the shunt transistor ($T_0$) is a bipolar transistor and the first differentiating element ($D_1$) is provided with a first capacitor ($C_1$), a first resistor ($R_1$), and a first amplifier transistor ($T_1$) designed as a bipolar transistor, with the first supply line ($VL_1$) being connected to the collector of shunt transistor ($T_0$), the collector of the first amplifier transistor ($T_1$), as well as, via the first capacitor ($C_1$), to the base of the first amplifier transistor ($T_1$), and with the second supply line ($VL_2$) being connected to the emitter of shunt transistor ($T_0$) as well as, via the first resistor ($R_1$), to the base of the first amplifier transistor ($T_1$), and with the emitter of the first amplifier transistor ($T_1$) being connected to the base of shunt transistor ($T_0$).

5. Circuit layout according to claim 4 wherein the overvoltage suppression device (U) is provided with a second differentiating element ($D_2$) from a second capacitor ($C_2$), from a second resistor ($R_2$), and from a second amplifier transistor ($T_2$) designed as a bipolar transistor, whose collector is connected to the first supply line ($V_{L1}$), and whose base is connected to the first supply line ($V_{L1}$) via the second capacitor ($C_2$), as well as to the second supply line ($V_{L2}$) via the second resistor ($R_2$), and whose emitter is connected to the base of the first amplifier transistor ($T_1$).

6. Circuit layout according to claim 5 wherein a Zener diode is provided as a threshold value detector whose cathode is connected to the first supply line ($VL_1$) and whose anode is connected to the base of one of the transistors ($T_0$, $T_1$, $T_2$) in the circuit layout, or to the second supply line ($V_{L2}$).

7. Circuit layout according to claim 6 wherein the base and the emitter of shunt transistor ($T_0$) are connected to each other via a leakage resistor ($R_0$).

* * * * *